United States Patent
Zaffetti et al.

(10) Patent No.: US 10,782,059 B2
(45) Date of Patent: Sep. 22, 2020

(54) SEALED SUBLIMATOR POROUS PLATES

(71) Applicant: HAMILTON SUNDSTRAND CORPORATION, Charlotte, NC (US)

(72) Inventors: Mark A. Zaffetti, Suffield, CT (US);
Jesse Joseph Stieber, Avon, CT (US);
Jeremy M. Strange, Windsor, CT (US);
Timothy R. Boysen, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 103 days.

(21) Appl. No.: 16/014,894

(22) Filed: Jun. 21, 2018

(65) Prior Publication Data

US 2019/0390889 A1 Dec. 26, 2019

(51) Int. Cl.
| | | |
|---|---|---|
| *F25D 3/04* | (2006.01) | |
| *F25C 1/16* | (2006.01) | |
| *C23C 4/01* | (2016.01) | |
| *C23C 4/02* | (2006.01) | |
| *C23C 4/06* | (2016.01) | |
| *B64G 1/22* | (2006.01) | |
| *C23C 4/18* | (2006.01) | |

(52) U.S. Cl.
CPC .............. *F25D 3/045* (2013.01); *C23C 4/01* (2016.01); *F25C 1/16* (2013.01); *B64G 1/22* (2013.01); *C23C 4/02* (2013.01); *C23C 4/06* (2013.01)

(58) Field of Classification Search
CPC .. F25D 3/045; C23C 4/01; C23C 4/06; C23C 4/02; C23C 4/18; F25C 1/16; B64G 1/22
USPC ............................................................ 62/56
See application file for complete search history.

(56) References Cited

U.S. PATENT DOCUMENTS

| | | | |
|---|---|---|---|
| 3,170,303 A * | 2/1965 | Rannenberg | F25B 19/00 |
| | | | 62/98 |
| 6,929,866 B1 | 8/2005 | Williams et al. | |
| 8,021,758 B2 | 9/2011 | Sambasivan et al. | |
| 2011/0272122 A1* | 11/2011 | Corbeil | F28F 21/089 |
| | | | 165/133 |

OTHER PUBLICATIONS

Anonymous, "What is thermal spray?", Downloaded 2018, URL<https://www.fst.nl/about/thermal-spray-process-what-is-thermal-spray/>, 15 pages.

* cited by examiner

*Primary Examiner* — Steve S Tanenbaum
(74) *Attorney, Agent, or Firm* — Cantor Colburn LLP

(57) ABSTRACT

According to an aspect of the present disclosure, a porous plate is provided. The porous plate includes a body having an upper surface, a lower surface opposite the upper surface and sidewalls extending between respective entireties of the upper surface and the lower surface, the body being formed of porous material, and a metallic coating, which is thermally deposited onto an entirety of the sidewalls to form a high-strength mechanical bond with the entirety of the sidewalls.

7 Claims, 3 Drawing Sheets

SEALED SUBLIMATOR POROUS PLATES

BACKGROUND

The following description relates to sublimator porous plates and, more particularly, to a method of sealing sublimator porous plates using thermal deposition processes.

Spacecraft cooling systems use sublimators to provide for cooling of various components. Within such sublimators, water or another fluid passes through a passage that separates a coolant passage and a porous plate. The water flows through the porous plate where it is exposed to the vacuum of space and freezes. Heat is conducted from the coolant layer through the water layer, via heat transfer fins, and then into the porous plate where the water sublimates.

Sublimators are thus a type of heat exchanger and, in order for this type of heat exchanger to work properly, edges of the porous plate must be sealed so that water or fluid does not escape. Currently, sealing is achieved by way of brazing processes in which braze alloy fills the pores of the porous plate. This process requires additional brazing steps which can be costly and time consuming.

BRIEF DESCRIPTION

According to an aspect of the present disclosure, a porous plate is provided. The porous plate includes a body having an upper surface, a lower surface opposite the upper surface and sidewalls extending between respective entireties of the upper surface and the lower surface, the body being formed of porous material, and a metallic coating, which is thermally deposited onto an entirety of the sidewalls to form a high-strength mechanical bond with the entirety of the sidewalls.

In accordance with additional or alternative embodiments, the high-strength mechanical bond withstands sublimator pressures.

In accordance with additional or alternative embodiments, a thickness of the metallic coating following a post application process is substantially uniform.

In accordance with additional or alternative embodiments, upper and lower edges of the metallic coating are flush with the upper and lower surfaces of the body.

In accordance with additional or alternative embodiments, the metallic coating includes a main sidewall member, an upper flange, which extends into the body from the main sidewall member, and a lower flange, which extends into the body from the main sidewall member.

In accordance with additional or alternative embodiments, respective exterior surfaces of the upper and lower flanges are flush with the upper and lower surfaces of the body.

According to an aspect of the present disclosure, a sublimator is provided and includes a first layer through which a first fluid flows, a second layer through which a second fluid, which has a lower temperature than the first fluid, flows and removes heat from the first fluid, and a porous plate, which extends across a substantial entirety of the second layer and to which the second fluid comes into contact and a metallic coating, which is thermally deposited onto an entirety of the sidewalls to form a high-strength mechanical bond with the entirety of the sidewalls. The porous plate includes a body having an upper surface, a lower surface opposite the upper surface and sidewalls extending between respective entireties of the upper surface and the lower surface, the body being formed of material, which is porous to the second fluid.

In accordance with additional or alternative embodiments, the high-strength mechanical bond withstands sublimator pressures.

In accordance with additional or alternative embodiments, the sublimator further includes a header of the second layer, and an inlet tube, which delivers the second fluid to the second layer via the header.

In accordance with additional or alternative embodiments, a thickness of the metallic coating following a post application process is substantially uniform.

In accordance with additional or alternative embodiments, upper and lower edges of the metallic coating are flush with the upper and lower surfaces of the body.

In accordance with additional or alternative embodiments, the metallic coating includes a main sidewall member, an upper flange, which extends into the body from the main sidewall member, and a lower flange, which extends into the body from the main sidewall member.

In accordance with additional or alternative embodiments, respective exterior surfaces of the upper and lower flanges are flush with the upper and lower surfaces of the body.

According to an aspect of the present disclosure, a method of sealing a porous plate of a sublimator is provided. The method includes fashioning a porous material into a plate, masking areas of the plate that are not to be coated, sealing unmasked areas of the plate by thermally depositing metallic material onto the plate, and unmasking the areas of the plate that are not to be coated.

In accordance with additional or alternative embodiments, the fashioning of the porous plate includes cleaning and preparing surfaces thereof, and the sealing further includes post-depositional diffusion.

In accordance with additional or alternative embodiments, the sealing includes one of thermal spraying of metallic material onto the plate and laser or plasma melting of powder or foil metallic material onto the plate.

In accordance with additional or alternative embodiments, the sealing includes forming and post application processing the thermally sprayed or melted metallic material into a metallic coating of substantially uniform thickness.

In accordance with additional or alternative embodiments, the method further includes machining thermally sprayed or melted metallic material to be flush with porous material surfaces.

In accordance with additional or alternative embodiments, the sealing includes forming the thermally sprayed or melted metallic material into a metallic coating includes a main sidewall member, an upper flange, which extends into the body from the main sidewall member, and a lower flange, which extends into the body from the main sidewall member.

In accordance with additional or alternative embodiments, the method further includes machining respective exterior surfaces of the upper and lower flanges to be flush with porous material surfaces.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, edges of a porous plate that can be used in a sublimator of a spacecraft or another type of vehicle are sealed without having to be brazed. Instead of brazing, a thermal deposition process, such as thermal spray processing, laser fusion, plasma fusion, etc., is executed with respect to one or more edges of the porous plate to thus apply a material to the one or more edges of the porous plate to create a sealed surface.

Figure 1:
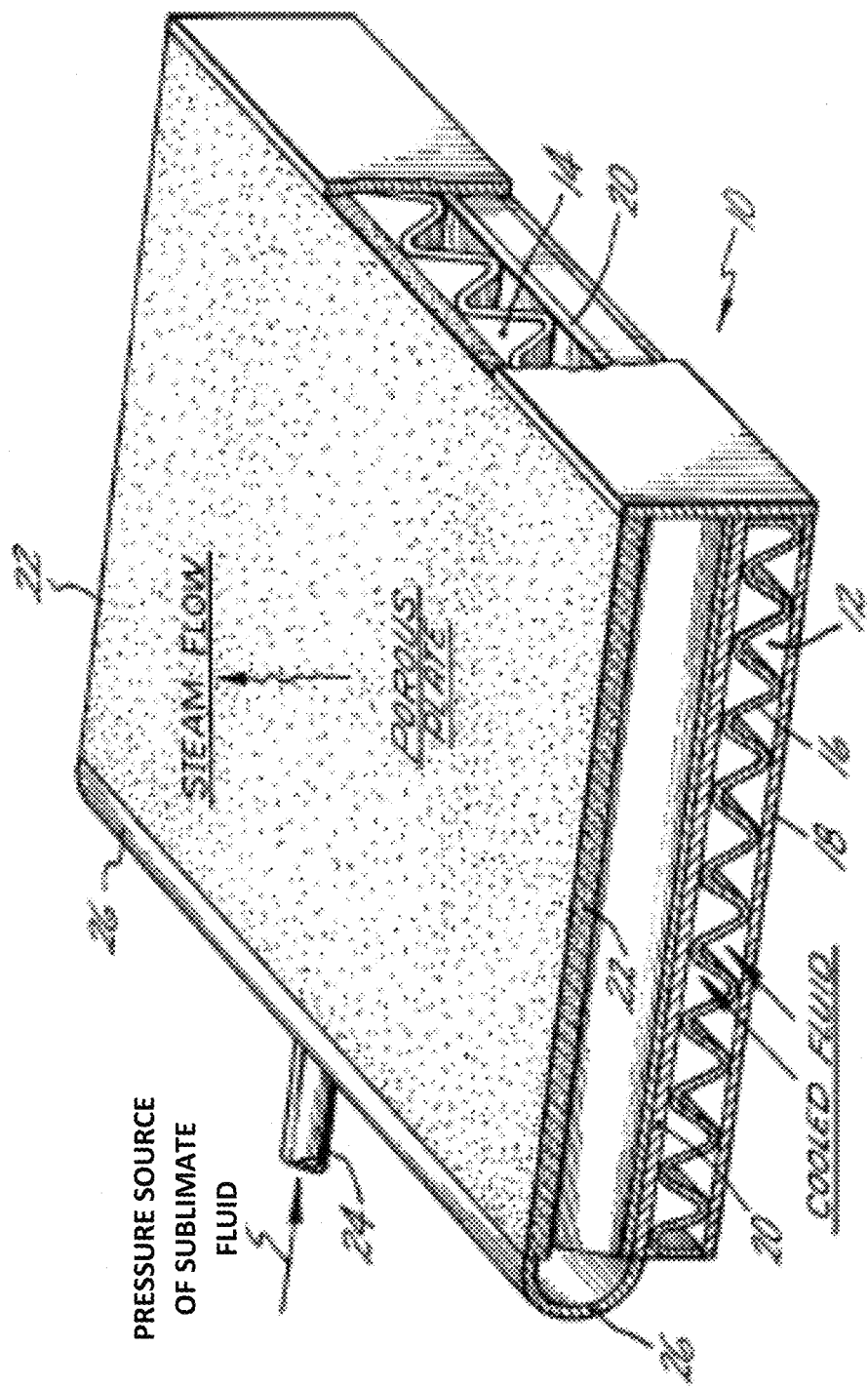
FIG. 1 is a perspective view of a sublimator in accordance with embodiments.

With reference to FIG. 1, a heat exchanger 10 includes a lower layer 12, an adjacent upper layer 14 and a header 26. The lower layer 12 includes fins 16 sandwiched between end plate 18 and intermediate plate 20. The fins 16, the end plate 18 and the intermediate plate 20 define a series of parallel conducting passages for receiving a first fluid (e.g., a hot fluid to be cooled). The upper layer 14 includes fins sandwiched between the intermediate plate 20 and an upper plate 22 such that the fins, the intermediate plate 20 and the upper plate 22 define a series of parallel conducting passages for receiving a second fluid (e.g., sublimate to cool the first fluid). The header 26 includes a cover 260 that defines an interior 261 of the header 26. The second fluid is fed to the parallel conducting passages of the upper layer 14 through inlet line 24 which feeds the interior 261 of the header 26 and in turn directs sublimate to the various parallel conducting passages.

Figure 2:
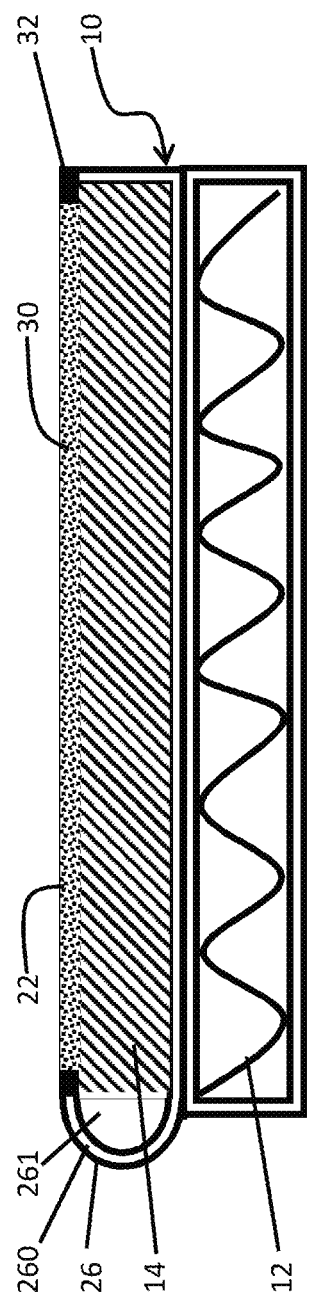
FIG. 2 is a cross sectional side view of a porous plate of the sublimator of FIG. 1.

With continued reference to FIG. 1 and with additional reference to FIG. 2, the upper plate 22 may be provided as a porous plate 30 that overlies a substantial entirety of the upper layer 14 and is subjected to or exposed to an atmosphere whose pressure will cause the second fluid to freeze. That is, as the second fluid flows through the upper layer 14, the second fluid enters into interstitial regions of the porous plate 30 and comes into contact with the low pressure environment. The second fluid thus changes state from a liquid to a solid sublimate in the pores of the porous plate 30. In some cases, the solid sublimate substantially forms a uniform sheet extending completely across the porous plate 30 and thus prevents flow through the porous plate 30. The solid sublimate eventually sublimates to the low pressure environment and is depleted which results in more of the second fluid flowing into the porous plate 30. Consequently, an amount of the second fluid that is sublimated to atmosphere is replenished in a self-regulating sublimation process.

To the extent that the porous plate 30 requires a seal around its periphery for the sublimation action described above to occur, the porous plate 30 of FIGS. 1 and 2 is provided with a seal 32 as described below that is formed according to a method of forming the seal as described below as well.

Figure 3:
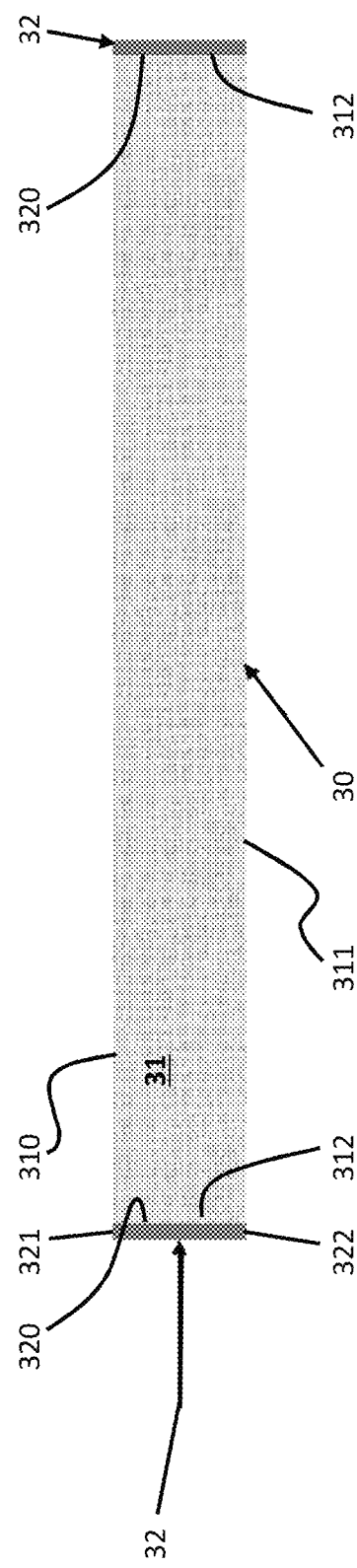
FIG. 3 is a schematic cross sectional side view of seals of the porous plate of FIG. 2 in accordance with embodiments.
Figure 4:
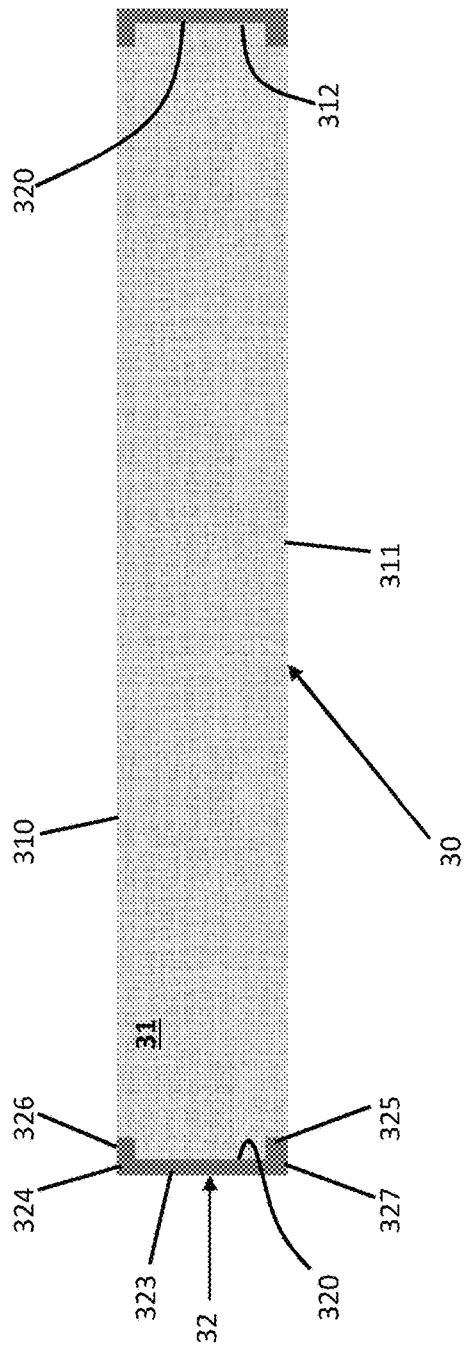
FIG. 4 is a schematic cross sectional side view of seals of the porous plate of FIG. 2 in accordance with further embodiments.

With reference to FIGS. 3 and 4, the porous plate 30 includes a body 31 and a metallic coating 32. The body 31 is formed of material which is porous relative to the second fluid and has an upper surface 310, a lower surface 311 opposite the upper surface 310 and sidewalls 312. The sidewalls 312 extend between respective entireties of the upper surface 310 and the lower surface 311. The metallic coating 32 acts as a seal to prevent the second fluid from flowing out of the porous plate 30 through the sidewalls 312. The metallic coating 32 is thermally deposited onto an entirety of the sidewalls 312 and forms a high-strength mechanical bond 320 that can withstand sublimator design pressures. The metallic coating 32 is interposed between the cover 260 of the header 26 and the body 31.

As shown in FIG. 3, the metallic coating 32 can be provided as substantially planarized layer with a substantially uniform thickness following a post application processing (e.g., grinding, machining, etc.) along the entirety of the sidewalls 312. In such cases, upper and lower edges 321 and 322 of the metallic coating 32 are flush with the upper and lower surfaces 310 and 311 of the body 31.

As shown in FIG. 4, the metallic coating 32 can be provided with a U-shaped cross-section. Here, the metallic coating 32 may include a main sidewall member 323 that extends as a substantially planarized layer with a substantially uniform thickness along a section of the sidewalls 312, an upper flange 324 and a lower flange 325. The upper flange 324 extends into the body 31 from the main sidewall member 323 by a relatively short distance and the lower flange 325 extends into the body 31 from the main sidewall member 323 by a relatively short distance. Respective exterior surfaces 326 and 327 of the upper and lower flanges 324 and 325, respectively, are flush with the upper and lower surfaces 310 and 311 of the body 31.

Figure 5:
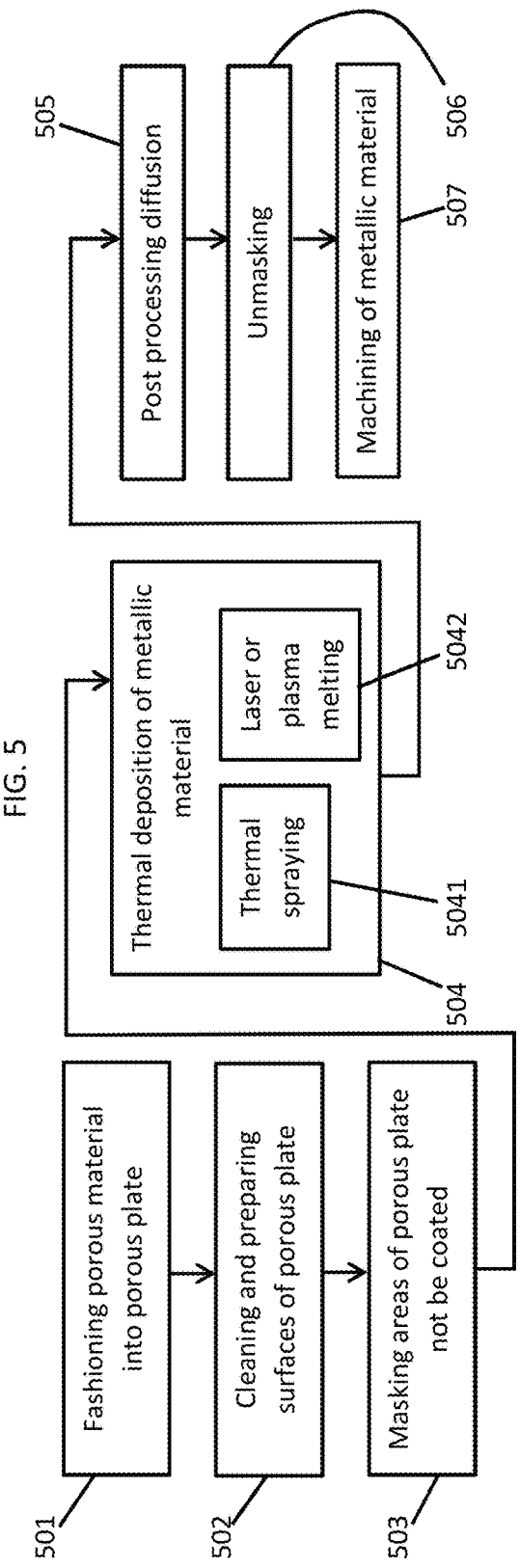
FIG. 5 is a flow diagram illustrating a method of sealing a porous plate in accordance with embodiments.

With reference to FIG. 5, a method of sealing a porous plate of a sublimator is provided. As shown in FIG. 5, the method includes fashioning porous material into a plate shape (501) and cleaning and preparing the various surfaces of the porous plate (502). The method further includes masking areas of the porous plate that are not to be coated, such as any surface area other than the sidewalls or edges (503). Once the masking is complete, unmasked areas of the porous plate are sealed by thermal deposition of metallic material onto the porous plate (504). The thermal deposition of operation 504 can be executed by one or more of thermal spraying of metallic material onto the porous plate (5041) and laser or plasma melting of powder or foil metallic material onto the porous plate (5042). This is followed by an optional post-processing diffusion operation (505) and an unmasking of the areas of the porous plate that are not to be coated (506). The method also includes a machining of thermally sprayed or melted metallic material such that the resulting metallic material is flush with porous material surfaces as shown in FIGS. 3 and 4 for example (507).

Technical effects and benefits of the invention described herein are the disclosure of a thermal deposition process that is less expensive and time consuming that current brazing approaches.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A porous plate, comprising:
a body having an upper major surface, a lower major surface opposite the upper major surface and minor sidewalls extending between respective entireties of the upper major surface and the lower major surface,
the body being formed of porous material; and
a metallic coating, which is thermally deposited onto an entirety of the minor sidewalls to form a thermal-sprayed or laser or plasma melted mechanical bond with the entirety of the minor sidewalls,
wherein the metallic coating has a u-shaped cross section and comprises:
a main sidewall member that extends along exterior edges of the minor sidewalls;
an upper flange, which extends perpendicularly with respect to the main sidewall member and into the body from the main sidewall member and comprises an exterior surface flush with the upper major surface of the body; and
a lower flange, which extends perpendicularly with respect to the main sidewall member and into the body from the main sidewall member and comprises an exterior surface flush with the lower major surface of the body.

2. The porous plate according to claim 1, wherein the thermal-sprayed or laser or plasma melted mechanical bond withstands sublimator pressures.

3. The porous plate according to claim 1, wherein a thickness of the metallic coating following a post application process is substantially uniform.

4. A sublimator, comprising:
a first layer through which a first fluid flows;
a second layer through which a second fluid, which has a lower temperature than the first fluid, flows and removes heat from the first fluid; and
a porous plate, which extends across a substantial entirety of the second layer and to which the second fluid comes into contact, the porous plate comprising:
a body having an upper major surface, a lower major surface opposite the upper major surface and minor sidewalls extending between respective entireties of the upper major surface and the lower major surface,
the body being formed of material, which is porous to the second fluid; and
a metallic coating, which is thermally deposited onto an entirety of the minor sidewalls to form a thermal-sprayed or laser or plasma melted mechanical bond with the entirety of the minor sidewalls,
wherein the metallic coating has a u-shaped cross section and comprises:
a main sidewall member that extends along exterior edges of the minor sidewalls;
an upper flange, which extends perpendicularly with respect to the main sidewall member and into the body from the main sidewall member and comprises an exterior surface flush with the upper major surface of the body; and
a lower flange, which extends perpendicularly with respect to the main sidewall member and into the body from the main sidewall member and comprises an exterior surface flush with the lower major surface of the body.

5. The sublimator according to claim 4, wherein the thermal-sprayed or laser or plasma melted mechanical bond withstands sublimator pressures.

6. The sublimator according to claim 4, further comprising:
a header of the second layer; and
an inlet tube, which delivers the second fluid to the second layer via the header,
wherein the header comprises a cover that defines an interior of the header and the metallic coating is interposed between the cover and the body.

7. The sublimator according to claim 4, wherein a thickness of the metallic coating following a post application process is substantially uniform.

* * * * *